Patented May 20, 1930

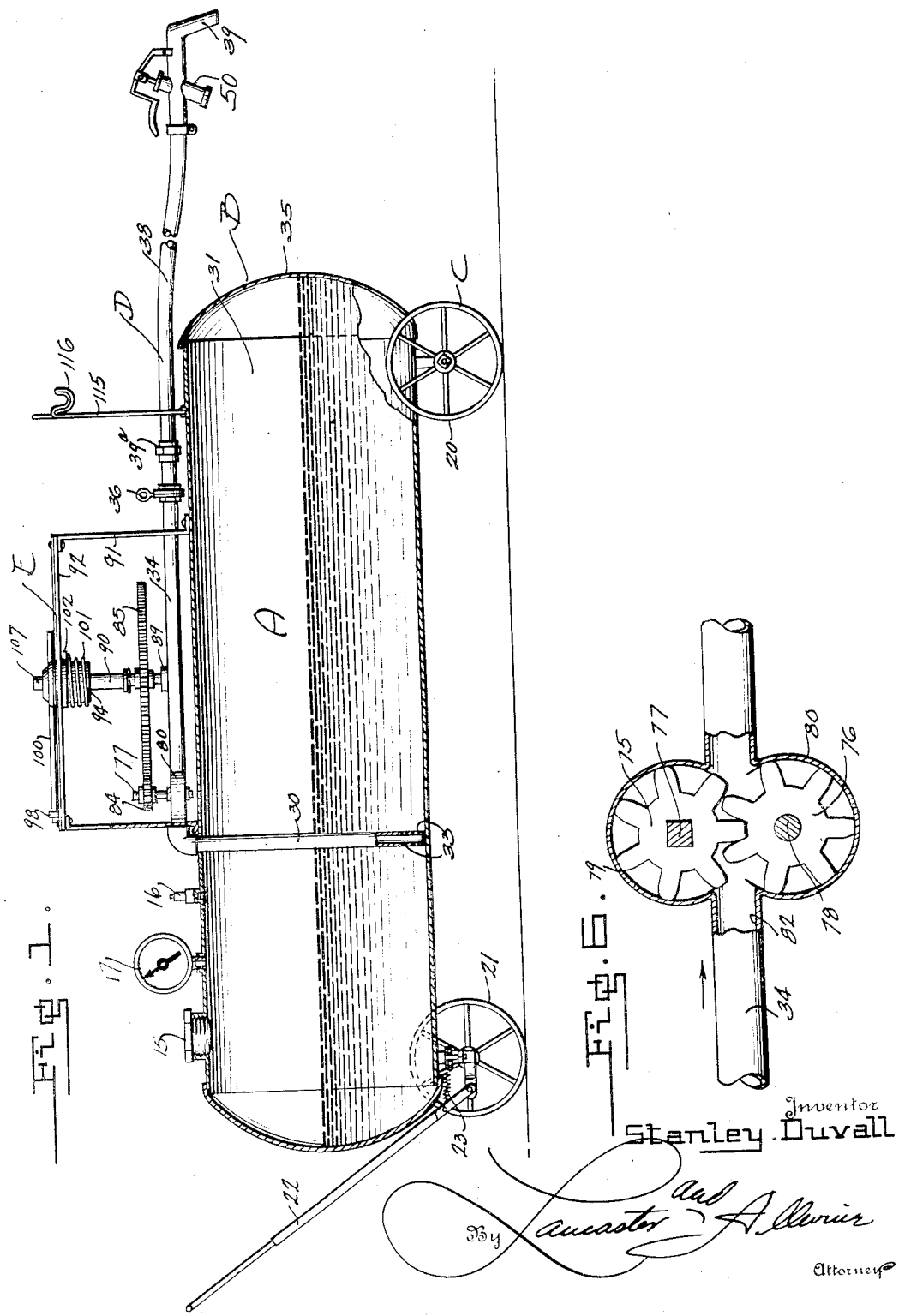

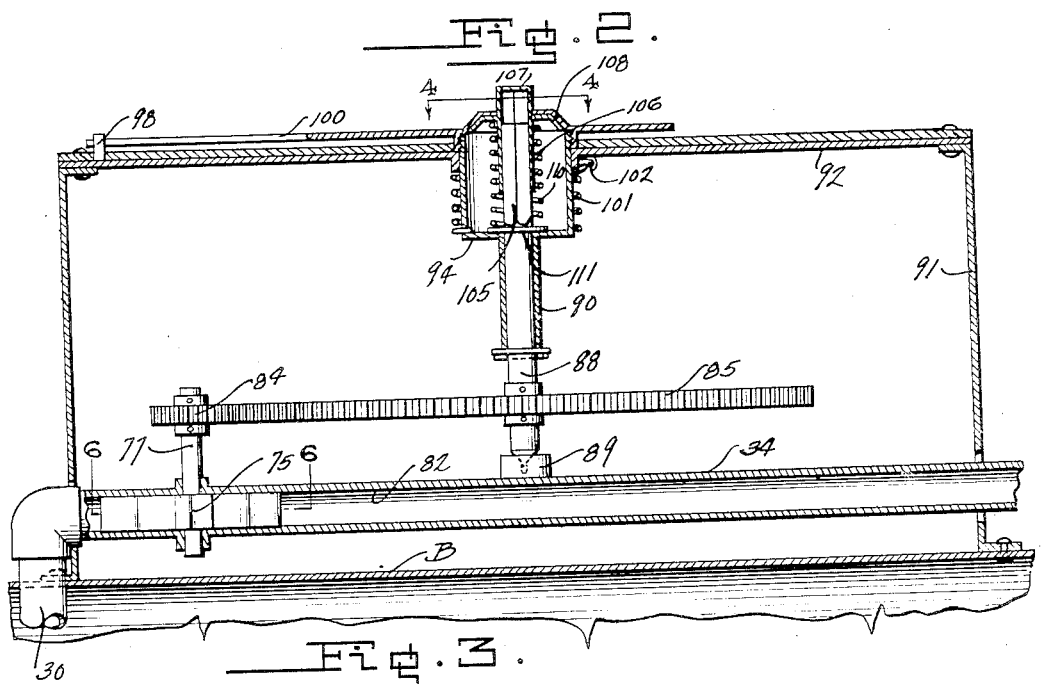
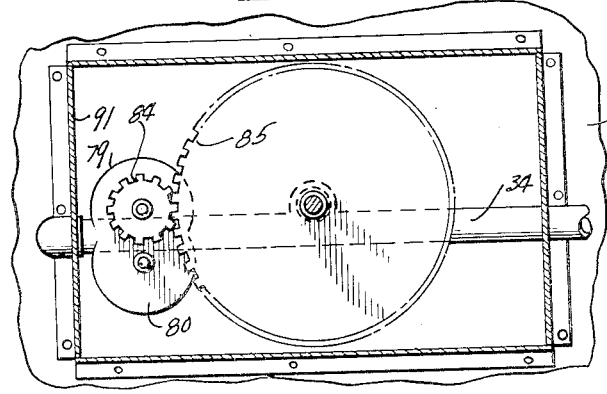
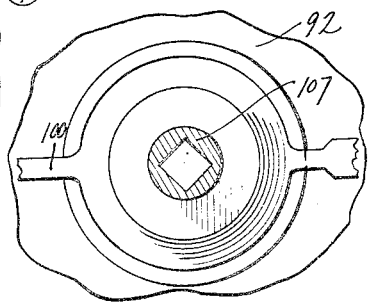
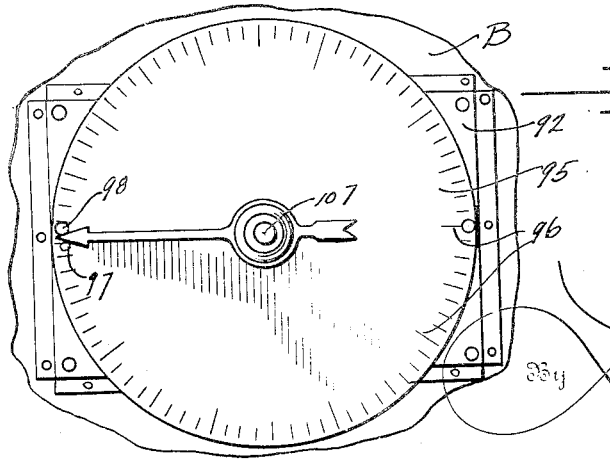

1,759,302

UNITED STATES PATENT OFFICE

STANLEY DUVALL, OF BRECKENRIDGE, TEXAS

METER FOR LUBRICANT-DISPENSING APPARATUS

Application filed June 17, 1924. Serial No. 720,691.

This invention relates to improvements in meter constructions.

The primary object of this invention is the provision of an improved liquid meter or measuring device particularly well adapted for pressure operated lubricant dispensing apparatus, embodying improved construction by means of which to selectively register a single or a limited number of dispensing operations.

Other objects and advantages of this invention will be apparent during the course of the following detailed description.

In the accompanying drawings, forming a part of this specification, and wherein similar reference characters designate corresponding parts throughout the several views, Figure 1 is a longitudinal cross sectional view taken through a grease tank, showing the novel meter mechanism as used therewith.

Figure 2 is a cross sectional view taken through the improved meter or indicating mechanism for lubricating apparatus by means of which the number of pounds of lubricant dispensed may be readily ascertained.

Figure 3 is a cross sectional view showing certain details of the improved indicating mechanism.

Figure 4 is a cross sectional view taken substantially on the line 4—4 of Figure 2.

Figure 5 is a plan view of the improved indicator which may be used in connection with the dispensing apparatus.

Figure 6 is a cross sectional view taken substantially on the line 6—6 of Figure 2.

In the drawings, wherein for the purpose of illustration is shown only a preferred embodiment of this invention the letter A may generally designate lubricant dispensing apparatus which may consist of a tank B; running gear C; dispensing structure D; and improved indicator means E for registering in accurate manner the amount of grease dispensed at any one operation or plurality of operations.

The tank B is of the horizontal pressure resisting type and has a filler plug 15; air valve 16; and pressure gauge 17.

The running gear C preferably consists of rear running gear 20 supporting the rear portion of the tank, and front running gear 21 supporting the front portion of the tank. A tongue 22 is preferably pivoted to the front running gear 21, and is normally held in upward relation above the ground or floor surface by means of a spring 23, of the tension type, tending to draw the tongue 22 toward the front wall of the tank, as is illustrated in Figure 1 of the drawings.

Referring to the dispensing structure D, the same consists of a vertical tube or conduit 30, supported from the top wall of the tank B, and depending within the compartment 31 of the tank, adjacent the bottom wall thereof. In the lower end of the vertical conduit 30 a series of perforations 33 are provided through which the grease or lubricant is forced by the compressed air in the compartment 31, upwardly within the passageway of the conduit 30. The conduit 30 extends outwardly of the tank B through an air tight connection, and extends horizontally, as at 34 along the top of the tank and toward the rear end 35 thereof. A gate valve 36, of any approved type is provided in the conduit portion 34 adjacent the rear end of the tank B, for the purpose of cutting off the supply of grease, as a protection to the flexible hose 38 which is coupled, as at 39ª, to the extreme rear end of the conduit 34. The flexible hose 38 at the free end thereof is provided with an L-shaped nozzle 39 which is suitably connected to the flexible hose 38 and includes a valve 50.

Referring to the indicator apparatus E, which is provided for the purpose of determining the number of pounds or the quantity of lubricant dispensed at a single or a series of operations, the same includes a pair of relatively small cog gears 75 and 76, which are mounted on shafts 77 and 78 for rotation within segmental shaped housings 79 and 80 respectively, so that the gears intermesh in line with the passageway 82 extending through the conduit 34, so that any lubricant passing through the conduit 34 must of necessity pass between the intermeshing gears 75 and 76, and rotate said gears during said passage. The shaft 77 is keyed for rotation with the cog gear 75 and extends upwardly above the casing, and has a pinion 84 keyed thereto which is in meshing relation with a very large gear 85, rotatably supported in fixed relation upon a shaft 88. The shaft 88 to which the gear 85 is keyed rests within a step bearing 89 which may be provided on the conduit 34, and at its upper end bears within a sleeve 90.

The details of the indicator mechanism, and especially the gears 84 and 85 are housed within an enclosure 91, and a removable lid 92 is preferably provided for this enclosure 91, and in which removable lid 92 in depending relation within the housing 91 is disposed a rotatable clutch casing 94 of which the sleeve 90 is a part. A dial 95 is supported upon the top 92, having graduations 96 thereon indicative of the number of pounds of grease, and a zero mark 97 is provided, adjacent which a stop pin 98 is placed. An indicator arm 100 is detachably screwed upon the upper portion of the rotatable casing 94, and moves with said casing 94. A spiral spring 101 is provided about the casing 94, below the removable lid 92, at one end being connected to a pin 102, which pin is fixed with the lid 92, and the opposite end of said spring being connected to the casing 94, so that the normal expansion of the spring tends to throw the indicator arm 100 back to the zero location against the stop pin 98.

The upper end of the shaft 88 is squared, as at 105, and a similarly shaped clutch sleeve 106 is longitudinally slidable on the squared portion 105, including a button head 107 which extends upwardly through the indicator arm 100, and which includes a conical shaped clutch portion 108. A compression spring 110 is provided, at one end engaging the conical shaped flange portion 108 and at its opposite end resting upon a washer 111 fixed on shaft 88 over the bottom of the casing 94, and which spring urges the clutch portion 108 into engagement with the indicator arm 100, so that upon rotation of the shaft 88 the indicator arm 100 will move therewith.

Referring to the operation of the meter, the gate valve 36 is normally left open when the dispensing apparatus is to be used, and the operator places the nozzle 39 in the desired mechanism to be lubricated or filled with grease, and by opening valve 50 the lubricant or other liquid will pass thru the nozzle incident to air pressure in the compartment 31, causing the cog gears 75 and 76 to rotate. This will rotate the meshing gears 84 and 85, and cause a corresponding rotation of the shaft 88. As the clutch part 108 is in engagement with the indicator arm 100 the indicator arm 100 as well as the clutch casing 94 will be rotated, and will indicate upon the dial 95 the number of pounds of grease used. After the dispensing operation the operator determines the number of pounds of grease used and the customer is charged accordingly. To release the indicator it is merely necessary to press upon the button head 107, which compresses the spring 110 and forces the clutch part 108 out of engagement with the indicator arm, and the spring 101 will then assert itself and rotate the clutch casing 94 back to zero position, until the pointer or indicator arm 100 engages the stop pin 98.

From the foregoing description of this invention it is apparent that a novel meter mechanism for dispensing apparatus has been provided, which may be operated to effectively perform the functions for which it is adapted.

A standard 115 having a hook 116 thereon is provided for supporting the hose 38 when not in use.

Various changes in the shape, size, and arrangement of parts may be made to the form of the invention herein shown and described, without departing from the spirit of this invention or the scope of the claims.

I claim:

1. In a metering device of the class described the combination of a rotary shaft, a stationary dial, a rotary hollow casing on the shaft rotatably bearing axially in said dial, a rotatable indicator connected on said rotatable hollow casing, a reciprocable clutch member non-rotatably mounted on said shaft in said hollow casing including a plunger end extending exteriorly of the said casing for manual operation to move the same, a spring in the hollow casing between the same and the clutch member forcing the latter into engagement with the hollow casing to releasably connect the hollow casing for rotation with the shaft, and spring means connected between the dial and hollow casing to normally urge the hollow casing and indicator to rotate in one direction.

2. In a device of the class described the combination of a stationary dial, a rotary shaft concentric with the dial, a rotary hollow casing freely rotatable upon said shaft and rotatably bearing in said dial, a rotatable indicator connected with said hollow casing and operating over said dial, a plunger non-rotatably mounted upon said shaft for axial movement therealong, said hollow casing having an opening therein through which an exterior portion of the plunger extends, a spring in the hollow casing, a clutch portion connected with the plunger, said spring operating in a compressed relation between said portion and the hollow casing for urging said portion into a frictional clutching engagement with the hollow casing, whereby when in engagement therewith the rotary casing will be connected with the shaft for rotation therewith, the plunger upon depression further compressing the spring to move the portion out of engagement with the rotary casing, and a spiral spring exteriorly about the rotary casing connected therewith at one end and at its other end with the stationary dial to normally cause rotation of the said casing in one direction.

STANLEY DUVALL.